United States Patent [19]

Bakalar

[11] Patent Number: 4,664,854
[45] Date of Patent: May 12, 1987

[54] INJECTION MOLDING EQUIPMENT AND METHOD

[75] Inventor: Jerome Bakalar, Lauderhill, Fla.

[73] Assignee: Neolens, Inc., Miami, Fla.

[21] Appl. No.: 816,197

[22] Filed: Jan. 6, 1986

[51] Int. Cl.[4] .............................................. B29D 11/00
[52] U.S. Cl. .................................. 264/2.2; 264/297.8; 425/447; 425/555; 425/588; 425/808
[58] Field of Search ................... 264/1.1, 2.2, 297.2, 264/297.8, 328.7; 425/808, 555, 588, 447

[56] References Cited

U.S. PATENT DOCUMENTS

| | | | |
|---|---|---|---|
| 4,091,057 | 5/1978 | Weber | 425/808 |
| 4,184,835 | 1/1980 | Talbot | 425/808 |
| 4,364,878 | 12/1982 | Laliberte et al. | 425/808 |
| 4,372,740 | 2/1983 | Kuramochi et al. | 425/808 |
| 4,540,534 | 9/1985 | Grendol | 425/808 |
| 4,569,807 | 2/1986 | Boudet | 425/808 |

FOREIGN PATENT DOCUMENTS

| | | | |
|---|---|---|---|
| 95429 | 6/1982 | Japan | 425/555 |
| 187223 | 11/1982 | Japan | 264/1.1 |
| 131429 | 7/1984 | Japan | 264/1.1 |
| 212230 | 12/1984 | Japan | 425/555 |
| 208214 | 10/1985 | Japan | 425/808 |

*Primary Examiner*—James Lowe
*Attorney, Agent, or Firm*—Cushman, Darby & Cushman

[57] ABSTRACT

Method and apparatus for molding a plurality of lenses of thermoplastic resin of different optical power and/or mass that comprises a plurality of molding stations, each including a rigidly supported male mold and a female mold allowed to float freely within defined limits. At each molding station, a wedge-shaped slide member whose position is controlled by a hydraulic piston is movable an independent distance over the female mold between a home position allowing maximum free floating and an operative position independent for each slide member to transfer a compression force onto an injected body of molten resin at said station. The hydraulic pistons are actuated from a common manifold to allow equal compression pressure at each molding station after the slide members move their independent distances.

23 Claims, 5 Drawing Figures

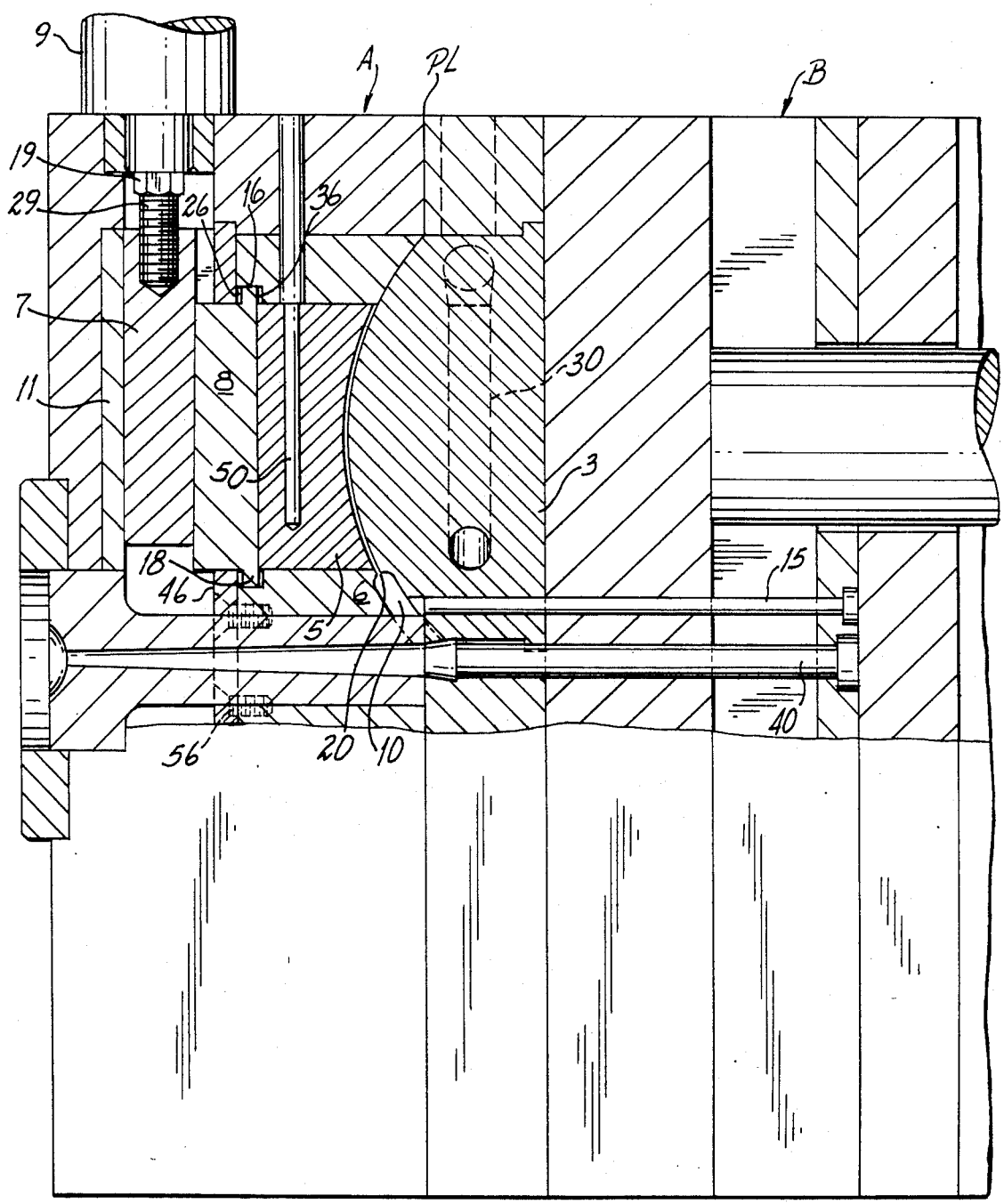
FIG-1-

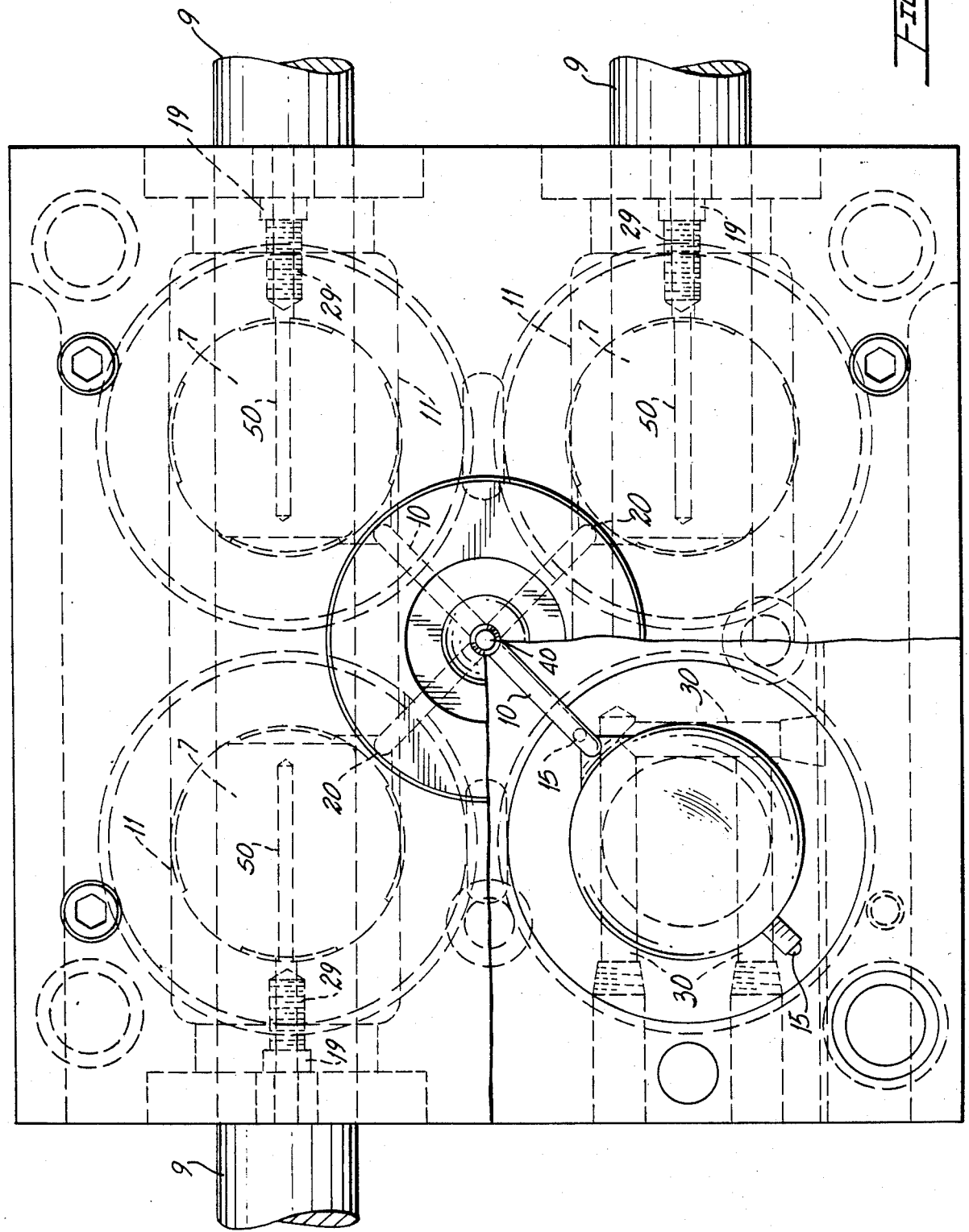

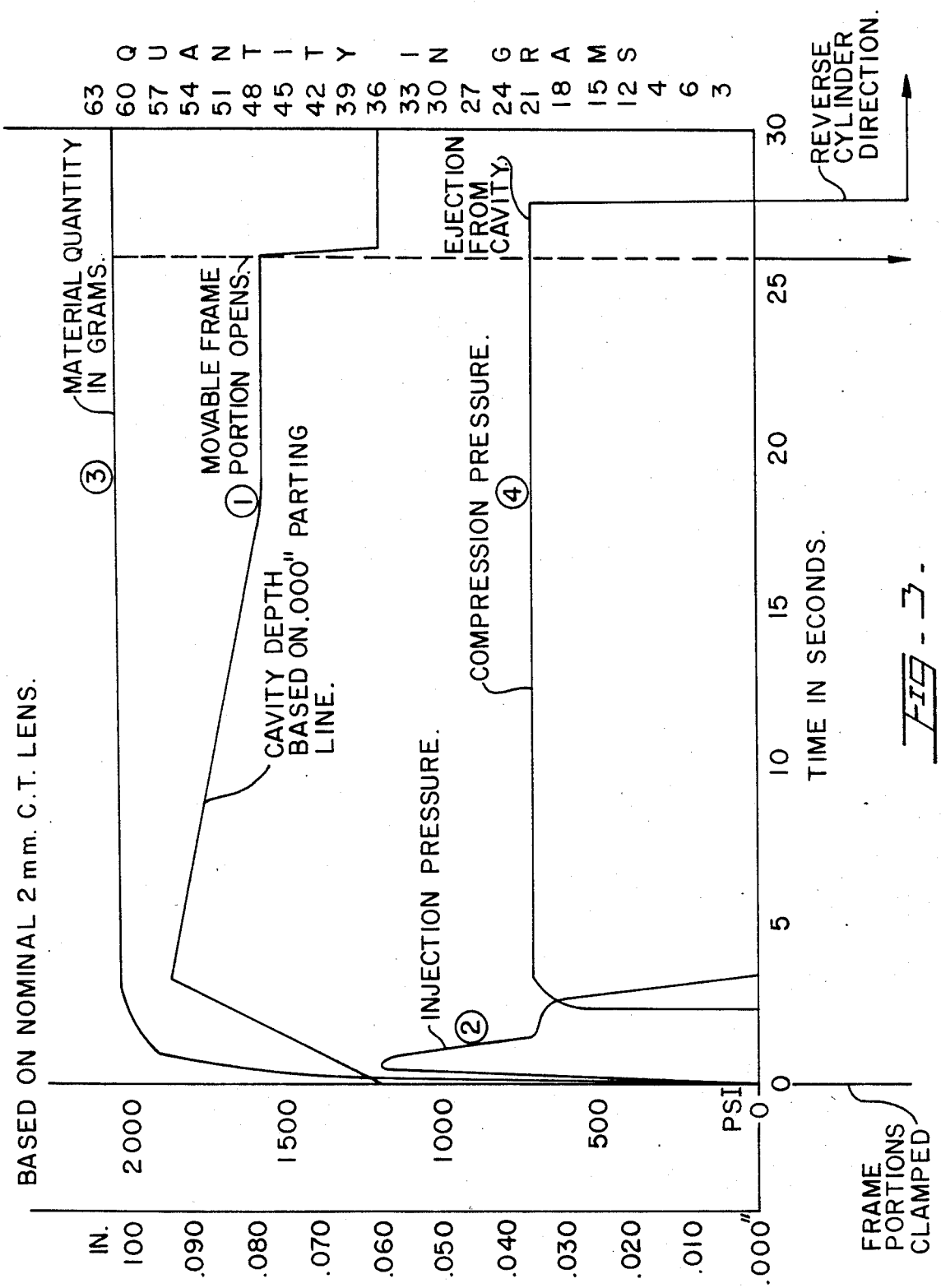

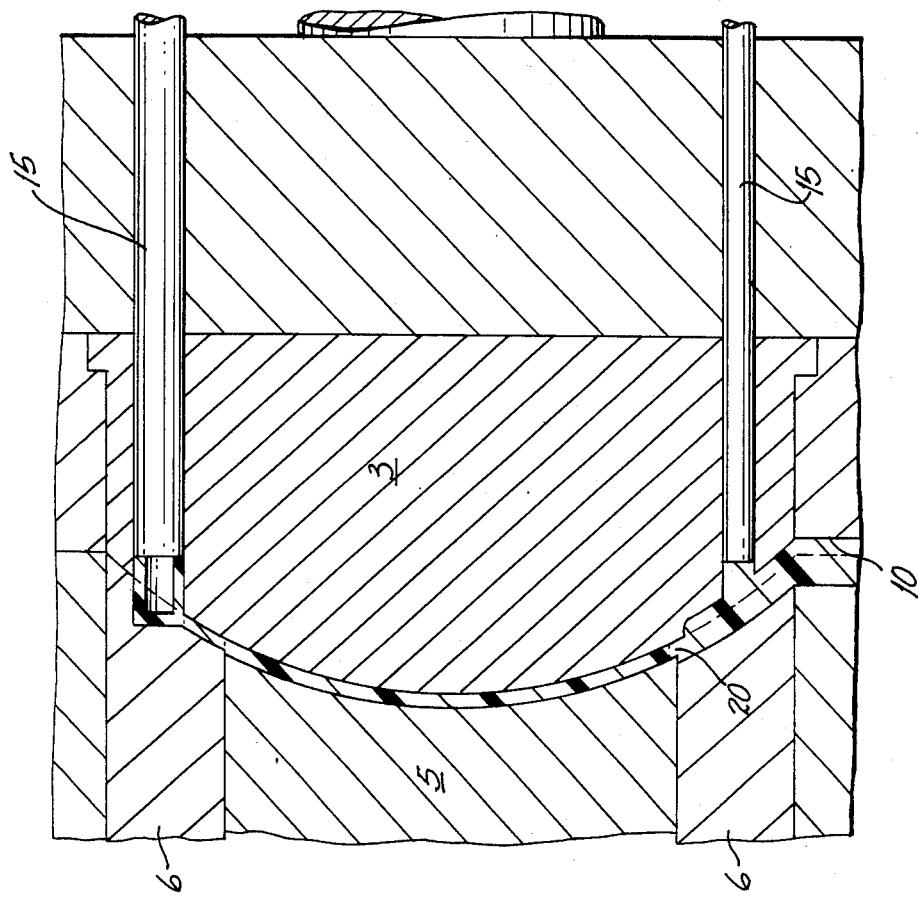
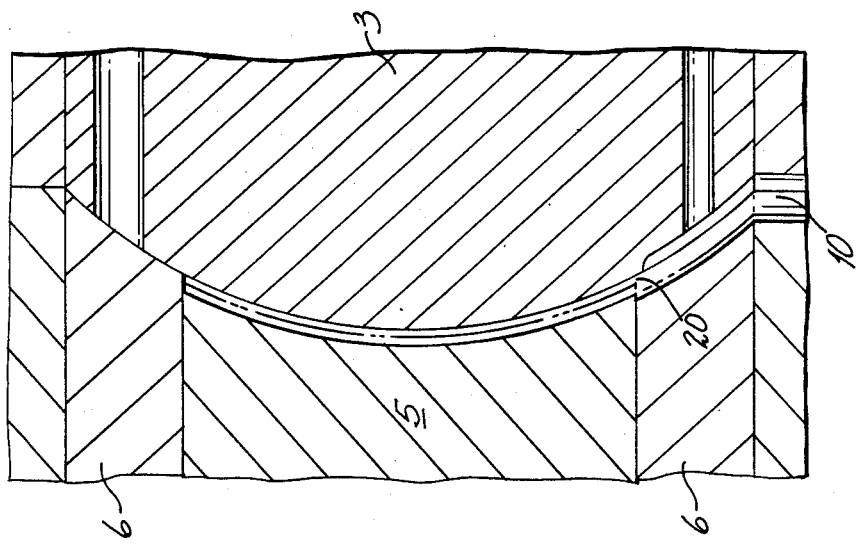

INJECTION MOLDING EQUIPMENT AND METHOD

BACKGROUND OF THE INVENTION

1. Field of the Invention.

This invention relates to the simultaneous molding of polycarbonate lens blanks and the like, particularly the simultaneous molding of a plurality of lens blanks of either the same or different optical power. Although polycarbonate lenses are mentioned throughout this specification, it is understood that this invention is equally adaptable to molding other thermoplastic resins.

2. Technical Problems and Prior Act.

In the past, ophthalmic lenses and instrument lenses and small windows have been molded from polycarbonate resin and other thermoplastic materials. In order to be commercially acceptable, lenses must be free of blemishes and distortions and have edge portions free from starring that results from non-uniform setting within a mold cavity of the thermoplastic material of which the lens is composed.

The optical properties of molded lenses are difficult to control. Many parameters must be controlled to insure adequate optical and other physical properties of the polycarbonate lenses. These parameters include the quantity and temperature of the resin, mold temperature, clamp pressure, injection speed and pressure at which the molten resin is injected to fill the mold cavity, the pressure that the molding members apply to the resin entrapped in the filled cavity and the duration of the cycle steps. These factors must be correlated for each different size, thickness and optical power of mold blank produced.

It is imperative that polycarbonate lenses be produced having a minimum of stress. One factor that minimizes stress is the uniformity of application of molding pressure in the direction of the thickness of the blank throughout the extent of the major surfaces of the blank, at least during the time it takes for the resin to set. This result occurs when the charge of liquid polycarbonate fills the cavity completely so that the opposite molds engage both major surfaces of the molten charge throughout their entire extent throughout substantially the entire duration of the compression step that follows the step of injecting the molten resin into the mold cavity to form a finished article. Each different lens mass requires a unique minimum duration of substantially uniform compression to reduce stress to a value sufficiently low to insure adquate optical quality.

Stress is most difficult to avoid around the edge of the lens blank. Starring is present in lenses that are stressed along their edge portions. When an optometrist edges or machines a lens blank to conform to the shape of an eyeglass frame, starring due to grains caused by stress when the plastic is compressed non-uniformly within the mold cavity results in edge weakness that leads to eventual breakage or distortion of the lens. Immediate application of elevated pressure to compress the charge of molten polycarbonate must be uniform throughout the extent of the major surfaces of the charge.

When a plurality of lenses of equal size and optical power are produced simultaneously with prior art apparatus, it is most convenient for each cavity at each molding station of multiple mold station molding apparatus to be identical in all dimensions with those of the other stations. Otherwise, a combination of criteria suitable to produce a lens of a given size and optical power that is sufficiently free of stress to avoid excessive defects in said lens would not necessarily produce a lens of different size and optical power also free of defects.

Injection molding, compression molding and a combination of injection molding and compression molding have been used previously to fabricate polycarbonate lenses. Also, the prior art has used multiple molds that simultaneously produce identical molded parts from each of the molds of multiple mold apparatus. Unfortunately, a combination of parameters suitable to produce lenses of one size and thickness is not necessarily suitable to produce lenses of different sizes and thicknesses. Consequently, lens molding apparatus of the prior art, whether a single mold type or a multiple mold type, was capable of making lenses of a single size and shape and required a change of mold periodically. Production problems would be simplified if multiple mold apparatus were available to produce acceptable lens blanks of different size and optical power simultaneously.

U.S. Pat. No. 4,091,057 to Weber discloses a typical method and apparatus for injection molding polycarbonate lenses. The preferred embodiment of this invention takes approximately 10 seconds to inject molten plastic into a cavity and then applies 20 tons force for approximately 30 seconds. Only one molding station is present in this apparatus and a replaceable insert 52 or 57 is provided behind each molding member 59 or 60 to adjust the compression applied to the molten plastic in response to a change in thickness of a mold cavity within which the polycarbonate is injected. This apparatus cannot produce lenses of different sizes and optical power simultaneously.

U.S. Pat. No. 4,184,835 to Talbot discloses mold apparatus that combines both injection molding and compression molding principles to mold parts from thermoplastic resins. A cam 19 is actuated to move horizontally within a cam slot 20 by a piston 22 associated with a hydraulic cylinder 21 to lift a male mold member 13 towards a female mold member 11 during the last 20 to 25% of a mold cycle, preferably 5 to 10% of the last portion of the mold cycle, to provide the compression molding step of the molding cycle.

U.S. Pat. No. 4,309,379 to Dannels et al. discloses method and apparatus for compression and injection molding two or more articles of thermosetting molding material simultaneously. This patent does not suggest how one can simultaneously produce articles of different size and thickness in the different molds.

The enumerated patents lack a teaching of how to equalize the compression of the molten plastic regardless of differences in thickness of the mold cavity at different molding stations. The prior art could produce lens blanks of different thickness and different optical power simultaneously only when a different molding apparatus was used to develop a molding cycle most suitable for each product having a different thickness and optical power from others.

BRIEF DESCRIPTION OF THIS INVENTION

This invention provides method and apparatus for simultaneously producing lens blanks of different thicknesses and shape at different molding stations of a single molding apparatus comprising a rigidly supported frame section A that defines a parting line with a movable frame section B. The latter is movable in a horizontal direction between a clamped molding position and an open unloading position. The movable frame section B rigidly supports a male mold at each molding station. Each molding station also supports a floating female mold that is movable relative to rigidly supported frame section A. A retainer ring is provided to keep each female mold in alignment with its associated male mold. Means is provided in the retainer ring to define the limits of free floating for the female mold.

A common source of molten polycarbonate resin communicates with a plurality of radially extending runners. Each of the latter extends through a different retainer ring associated with a different molding station and terminates in a gate that is deeper than the initial depth of the cavity formed between said molds at each associated molding station. The molds are heated to controlled temperatures cooler than the temperature of the injected molten resin during a molding cycle. The female mold is initially positioned so that it partly overlaps the gate to form a window therewith, the depth of said window being independently adjustable at each molding station by independent selection of the amount of overlap.

The polycarbonate resin is injected under pressure in the molten state from said common source through the runners and said independently adjusted windows at said gates to flow into the cavities formed between the molds and within the retainer rings. The resin is injected at adequate injection pressure to move the female mold from its associated male mold an independent distance in each molding station. All female molds are moved simultaneously either the same or different displacements during said resin injecting step. The amount of female mold movement is a function of mass of resin injected. The latter is adjustable by adjusting at least one of the following: the injection pressure, the initial depth of the gate window through which the resin is injected into its associated mold cavity, and the temperatures of the molds defining each different mold cavity.

A slide housing located in the A-section extends horizontally in alignment beyond each female mold. A wedge-shaped slide is movable horizontally within said slide housing between a home position and an operative position. A different hydraulic cylinder is associated with each wedge-shaped slide member to actuate the latter. A common manifold communicates with each hydraulic cylinder to actuate all of the slides simultaneously. This actuation takes place when a shot of injected resin sufficient to move each female mold has moved the female mold defining the lens blank of greatest mass a predetermined distance in its associated molding station. The hydraulic pressure applied to each individual piston moves each wedge-shaped member an independent distance for each molding station that is a function of the injection pressure that the injected polycarbonate applies to the female mold in its associated cavity. However, as the wedge-shaped members move into their operating positions, they apply compression force to the charges through their associated female molds. Each wedge-shaped member is stopped at an independently determined distance from its initial home position when the injection pressure of its associated cavity is reduced from more than to less than the hydraulic pressure. The hydraulic pressure applied is sufficient to insure optimum optical characteristics to the charge of greatest mass of the mix of sizes being molded simultaneously. This feature insures that the hydraulic pressure is essentially equal from station to station regardless whether the charges have the same or different mass so that all of the charges of different configuration are compressed for sufficient time at a sufficiently high pressure for each charge throughout its extent to minimize stress in the resulting molded lenses. The application of pressure higher than the minimum required for less massive blanks does not detract from the optical properties of said less massive blanks. The mass of molten resin injected may also be varied from station to station by adjusting the home position of each wedge-shaped slide member relative to its actuating position, and/or by using wedge-shaped members of different thickness for different molding stations.

The compressive forces continue while the molds cool the injected charges until after all the injected charges are cooled to a temperature sufficient for removal. The continuation of compression avoids distortion during shrinkage that results from cooling. When the B section is retracted to disengage the male molds, the compressive forces continue momentarily to insure that the lens blanks are ejected uniformly from the retainer rings, thus preventing distortion during their removal from the molding stations.

BRIEF DESCRIPTION OF DRAWINGS

FIG. 1 is a sectional view in elevation of one of a plurality of molding stations of a multiple station molding apparatus conforming to this invention.

FIG. 2 is a view of a multiple station molding apparatus of this invention partly in end view and partly in section, showing construction of different portions of different molding stations of said apparatus.

FIG. 3 is a time chart of various parameters controlling the method performed at one of said molding stations.

FIG. 4 is a schematic enlarged elevational view of a gate area for one of the molding stations, showing how its gate is arranged relative to the initial space between the perimeter of a female mold and a parting line to form a window of less initial depth than that of said gate at the start of an injection step in phantom, and at an intermediate stage of the molding cycle when the cavity is completely filled in full lines, and FIG. 5 is a view similar to FIG. 4, showing the female mold in its clamping position during a later stage of the molding cycle, and also showing ejector pins at said molding station.

DESCRIPTION OF A PREFERRED EMBODIMENT

A preferred embodiment of this invention comprises a frame including movable frame section B supporting at each of a plurality of molding stations a male mold 3 having a molding surface of convex configuration conforming to the curvature desired for one major surface of a lens to be molded. Male mold 3 is rigidly supported on frame section B. The position of male mold 3 is adjustable between a molding position shown in FIGS. 1 and 5 and an unloading position (not shown) by moving frame section B. A fixed frame section A supports a female mold 5 having a molding surface of concave configuration conforming to the curvature desired for the opposite major surface of said lens.

A parting line PL defines the boundary between fixed frame A and movable frame section B when the latter rigidly holds male mold 3 at its molding position. Female mold 5 is supported in free floating relation within a retainer ring 6. The latter surrounds female mold 5 to one side of the perimeter of male mold 3 which is larger than female mold 5. Retainer ring 6 has an inner end abutting said perimeter when male mold 3 is in its molding position. Ejector means 15 are extendable through the peripheral portion of male mold 3.

An insert cap 8 rests against female mold 5. Insert cap 8 has a radial enlargement 18 extending circumferentially outward to fit within a circumferential recess 16 in the outer portion of retainer ring 6. The recess 16 has an outer shoulder 26 formed by a ring 46 secured to retainer ring 6 by flat head screws 56 and an inner shoulder 36 that limit outward and inward free floating movement of female mold 5.

A slide housing 11 fixed to the fixed frame section A and connected to the outer end of retainer ring 6, receives a wedge-shaped slide member 7 that moves axially horizontally therewithin and also receives insert cap 8 that is free to move a limited radial distance within slide housing 11. A hydraulic piston 9 is oriented horizontally with the outer end of its piston rod secured to one end of wedge-shaped slide 7 in a threaded connection to move the latter horizontally between a home retracted position (not shown) which limits free floating outward movement of female mold 5 and an operating extended position as shown in FIG. 1 in which slide member 7 engages a displaced cap member 8 in wedge engagement thereagainst.

A runner 10 is shown in FIG. 1 formed at parting line PL between male mold 3 and ring member 6 extending from a sprue 40 and terminating in a gate 20 that faces a portion of the inner surface of retainer ring 6 at a position facing a region extending away from the molding surface of male mold 3 at its perimeter when mold 3 occupies its molding position. The gate 20 has a depth greater than that of the space originally established between the perimeters of the molding surfaces of molds 3 and 5 when radial enlargement 18 is initially positioned where desired within circumferential recess 16 to hold female mold 5 in an initial position spaced from male mold 3 a distance less than the thickness of a lens blank to be molded while male mold 3 is in its molding position. The depth of circumferential recess 16 is greater than that of radial enlargement 18 to allow female mold 5 to float freely to an outer limit defined by either radial enlargement 18 engaging the outer shoulder 26 of recess 16 or insert cap 8 engaging slide member 7 at or near its home position when resin is injected into a cavity formed between molds 3 and 5 and within retainer ring 6, as will be explained later.

As seen in FIG. 2, runner 10 is one of four runners extending radially from sprue 40 that feeds molten polycarbonate resin to the four runners 10. While four runners are shown in the preferred embodiment, a different number of runners may be used without departing from the gist of this invention. When molten resin is injected through the four gates 20 simultaneously, the amount of resin injected within each cavity is a function of many factors including the mold temperature of that cavity and the depth of the window formed at the corresponding gate 20. Initially, the window has a minimum depth as its gate is partially closed by the initial position of female mold 5. The window depth increases to a maximum depth controlled by displaced cap member 8 engaging slide member 7 as resin is injected into the cavity. Slide member 7 has dimensions such that when its associated hydraulic piston 9 retracts, cap member 8 becomes free to move a limited distance to a displaced position within housing 11 so that female mold 5 is free to move a limited distance when the volume of resin injected into the cavity exceeds the original volume of the cavity established when radial enlargement 18 is initially positioned within recess 16.

Each slide member 7 is individually adjustable in axial position relative to its associated piston 9 to control its home position. Rotation of an adjustment nut 19 along an externally threaded shaft 29 connecting the thick end of slide member 7 to said piston 9 fixes the horizontal home position of wedge-shaped slide member 7 within housing 11. When slide member 7 is adjusted to have a home position separated from piston 9, its home position engages the displaced cap member 7 sooner than when slide member 7 has a home position closer to said piston. Hence, the window formed by female mold 5 and gate 20 is controlled to a lesser maximum depth when the slide member 7 is adjuted to have a home position farther from piston 9 than the maximum window depth associated with a home position closer to piston 9. Another way to control the depth of the window at said gate is by replacing wedge-shaped slide member 7 with another slide member having a different wedge angle or a different thickness. Fine tuning of the maximum depth of the window results from rotation of adjustment nut 19 and greater change in maximum window depth results from changing the wedge-shaped slide member. The wedge-shaped slide members 7 are readily changed or adjusted without moving frame portion A from the apparatus.

The insert cap 8 may have different positions at different molding stations by independently adjusting the initial positions of the radial enlargements 18 of insert caps 8 relative to recesses 16. Such variations in position define different amounts of overlap between female molds 5 and gates 20 to define the initial depth of the window at each gate independently. Repositioning of enlargement 18 relative to recess 16 of its associated retainer ring 6 whenever a female mold 5 is changed represents another way of independently adjusting the depth of window at any molding station. Still another way of adjusting the initial depth of the window is accomplished by inserting a shim of selected thickness between female mold 5 and insert cap 8 at any molding station.

Each of the hydraulic pistons 9 is coupled to a common manifold (not shown). As soon as all four charges are simultaneously injected through runners 10 and the windows at the gates 20 to the four cavities at said molding stations, a solenoid causes all four hydraulic pistons to extend, thus moving wedge-shaped slide members 7 into their operative positions where they apply compression pressure to the injected resin through associated cap members 8 and female molds 5. The different slide members for different molding stations may move different distances depending on how far its associated female mold 5 and cap member 8 move to meet the bottom of associated wedge-shaped slide member 7. Compressive force is applied throughout the entire major surfaces of the charges in the direction of their thickness in all the cavities regardless of the volume of resin injected therein at a substantially uniform pressure for each of the cavities sufficiently high to insure that all of the lens blanks molded have a minimum stress established during the molding operation.

Conventional heating elements 30 and 50 are provided for respective molds 3 and 5. Electrical heating elements 50 are preferred for molds 5 and conventional water circulating heaters 30 are preferred for molds 3.

These controlled temperatures insure that the mold temperatures are optimum for the volume of resin injected in each cavity.

The chart of FIG. 3 shows a typical program for a molding station having a gate 0.100 inch deep to produce lens blanks having a nominal center thickness of 0.078 inch. The thickness of the lens blanks may vary at different rates from that of the center thickness, depending on the optical power desired for the lens. Line 1 shows that the floating female mold 5 is initially supported with its molding surface spaced 0.060 inch from the parting line PL to provide an initial window depth of 0.060 inch. Mold 5 moves away from the parting line to 0.092 inch spacing in response to resin injection in about 3.5 seconds. Line 2 shows a surge of injection pressure to about 1200 psi in about 0.8 seconds followed by an equilization pressure of about 700 psi for one second followed by relaxing the injection pressure to zero after about 3.5 seconds into the cycle. During the approximately first 3.5 seconds of the cycle, sufficient resin is injected to move female mold 5 to 0.092 inch from the parting line PL. The initial position of female mold 5 and the home position of slide member 7 establish the total mass of the injected charge of molten resin into the typical cavity.

The thickness of the typical charge in the typical cavity changes from 0.092 inch after 3.5 seconds to 0.079 inch after 19 seconds and then to 0.078 inch after 26 seconds in response to movement of slide member 7 from its home position to its operating position as will be explained later with reference to line 4. At that instant, movable frame section B retracts male molds 3 to their unloading positions and the female molds 5 move past their original positions 0.060 inch from parting line PL to force the lens blanks from the cavities. Ejector means 15 then separates the lens blanks from male molds 3 when movable frame section B reaches its final unloading position.

Line 3 shows how a 62 gram charge of molten polycarbonate resin fills the multiple mold apparatus comprising sprue 40, runners 10 and the four molding cavities in about 3.2 seconds. The entire charge of 62 grams remains in the multiple mold apparatus until ejected.

Line 4 shows that no pressure is applied to the common manifold for hydraulic pistons 9 until about 2.5 seconds into the cycle, which is about 1 second after the initial surge of 1200 psi high pressure injection filling has ended, so that initially, wedge-shaped slide 7 is located in its home position to allow cap portion 8 to move freely with female mold 5 a limited distance in response to the filling of the cavity. After about 2.5 seconds of the cycle, line 4 shows pistons 9 start to apply compression pressure, which reaches 700 psi about 3.2 seconds into the cycle. This compression pressure stays at 700 psi until 1.5 seconds after movable frame section B starts to retract male mold 3, and is applied to all four hydraulic cylinders 9 to force wedge-shaped slides 7 to their independent operating positions for the typical molding station. Inward slide movement stops when increasing compression pressure equals decreasing injection pressure at about 2.6 seconds into the cycle. As hydraulic pressure continues to rise and injection pressure falls to zero, the slide applies force through insert cap 8 and female mold 5 onto the injected resin until after the molded lens is ejected from the cavity at about 27.5 seconds into the cycle. After about 27 seconds, pistons 9 are retracted at a reverse pressure of 60 psi to move slide members 7 to their home positions for the next cycle. Male mold 3 is moved to parting line PL and female mold 5 returned to its initial position spaced 0.060 inch from male mold 3 to prepare for the next molding cycle after the lens blanks are removed.

B frame portion rigidly supporting male mold 3 moves from the molding position to the unloading position after about 26 seconds into the cycle. Compression pressure of 700 psi continues on hydraulic pistons 9 until about 27.8 seconds into the cycle to insure that the molded lenses do not hang up on retainer ring 6 and female mold 5 follows male mold 3 until mold 5 occupies a position slightly inward of its original molding position limited to one defined by radial enlargement 18 resting on the inner shoulder 36 of circumferential recess 16.

For lens blanks of different mass, the exact time when the compression pressure of line 4 crosses the reducing injection pressure of line 2 may differ by a small fraction of a second, but the duration of compression pressure is sufficient until ejection from the cavity to insure the production of lens blanks of minimum stress.

The initial and maximum depth of the window at each gate 20 may be adjusted at each cavity individually as previously explained should different volumes of resin be required for injection into different cavities. This feature is important when lenses of considerably different thickness are molded simultaneously.

The depth of the window formed by female mold 5 against gate 20 determines a coarse adjustment of the mass of resin injected into each associated mold cavity. The thickness of slide member 7 and its wedginess provides an intermediate control of the mass of molten resin that enters the associated cavity and rotation of adjustment nut 19 controls a fine adjustment of the amount of molten resin that enters each associated cavity. The finest adjustment is accomplished through individual temperature control of the male mold and the female mold at each molding station. The female mold is maintained between 195 and 250 degrees Fahrenheit and the male mold is maintained between 140 and 170 degrees Fahrenheit for producing lens blanks having a nominal thickness of 1.5 to 5 millimeters. The exact temperature selected depends on the mix of thicknesses being run simultaneously. Generally, the temperature of each male mold-female mold pair at each cavity will be individually adjusted regardless of the mass of resin in said cavity in order to balance the other adjustments.

Should the pistons 9 fail to operate in the proper time sequence, female mold 5 stops moving when radial enlargement 18 engages outer shoulder 26. This safety feature limits the amount of molten resin injected during a molding cycle.

The benefits of this invention are believed to result from the following features. The small mass of female molds 5 and cap members 8 provide very small resistance to the flow of resin into the many cavities, even after each cavity is full and the added resin injected imparts an injection pressure to move female mold 5. Also, compression force is applied to the injected resin by all the slide members 7 as the latter move into their operating positions. This enables one to insure that all lenses are molded at a desired minimum pressure for the lens blank of greatest mass in the mix of lens blanks being produced.

A preferred embodiment of this invention has been described and illustrated. It is understood that changes may be made without departing from the gist of this invention defined in the claimed subject matter that follows.

What is claimed is:

1. A method of molding a lens comprising:
    placing a male mold and a female mold in facing relation so as to define therebetween a molding space;
    mounting one of said molds for movement toward and away from the other mold;
    mounting gate means adjacent said other mold for providing a passage for thermoplastic resin; said other mold defining a window width for admitting thermoplastic resin to said molding space; said outer mold floating away from said one mold in response to the admission of thermoplastic resin;
    operatively engaging said other mold with compression means movable from a home position to an end position to move said other mold toward said one mold and to compress thermoplastic resin within said molding space;
    adjusting the home position of said compression means so as to define a maximum distance said other mold may be displaced from said one mold to thereby adjust the initial window width so as to balance thermoplastic resin fill speed and compression pressure applied to thermoplastic resin within said molding space;
    delivering molten plastic resin under pressure to said molding space until sufficient resin is injected to increase the distance of said other mold from said one mold to said maximum distance;
    reducing said injection pressure while moving said compression means so as to operatively engage and apply pressure to said other mold;
    continuing to apply pressure so as to compress said resin within said molding space to form a lens blank;
    moving said one mold away from said other mold to provide access to said lens blank; and
    removing said lens blank from said molding space.

2. A method as claimed in claim 1, wherein said step of mounting gate means comprises enclosing said other mold within a retainer ring element, said retainer ring element defining said gate means, said retainer ring element being capable of limiting movement of said other mold and stationing said other mold relative to said one mold so that a portion of said other mold overlaps a portion of the width of said gate means so as to form a window of less width than said gate means to control the rate of injection of molten resin.

3. A method as claimed in claim 2, wherein said step of adjusting the home position of said compression means comprises selecting a home position so as to define a maximum distance which does not exceed the width of said gate means.

4. A method as claimed in claim 1, wherein said step of operatively engaging said other mold with compression means comprises operatively engaging said other mold with a wedge-shaped slide member.

5. A method as claimed in claim 4, wherein said step of moving said compression means comprises applying pressure to a hydraulic piston which actuates said wedge-shaped slide member to move horizontally.

6. A method as claimed in claim 1, further comprising continuing to apply said pressure against said lens blank until said step of moving said one mold away from said other mold.

7. A method as claimed in claim 1, wherein said step of moving said compression means comprises applying pressure to a hydraulic piston which actuates said compression means to move.

8. A method of molding a lens comprising:
    (a) fixedly attaching a male mold to a movable frame member;
    (b) supporting a free-floating female mold in a fixed frame member;
    (c) placing said movable frame member and said fixed frame member in facing relation so as to define a parting line therebetween and so that an end of said female mold is in aligned relation to said male mold, said end of said female mold being spaced a predetermined distance from said male mold so as to define a cavity therebetween;
    (d) enclosing said female mold within a retainer ring member, said retainer ring element defining a gate for delivery of molten plastic resin to said cavity, said retainer ring being capable of limiting movement of said female mold and stationing said female mold relative to said parting line so that a portion of said female mold overlaps a portion of the depth of said gate so as to form a window of less depth then said gate to balance the resin fill speed;
    (e) operatively engaging the other end of said female mold with a wedge-shaped slide member; said slide member having a home position and an end position to move said female mold toward said one mold and to compress thermoplastic resin within said cavity;
    (f) selecting a home position for said wedge-shaped slide member so as to define a maximum distance said female mold may be displaced from said male mold so as to adjust the initial window width;
    (g) delivering molten plastic resin under pressure to said cavity until sufficient resin is injected to increase the distance of said female mold from said male mold to said maximum distance;
    (h) reducing said injection pressure while moving said wedge-shaped slide horizontally so as to operatively engage and apply pressure to said female mold, and continuing to apply pressure so as to compress said resin within said cavity to form a lens blank;
    (i) separating said movable frame member from said fixed frame member to provide access to said lens blank;
    (j) removing said lens blank from said molding station.

9. A method as claimed in claim 8, wherein said step of selecting a home position for said wedge-shaped slide member comprises selecting a home position so as to define a maximum distance which does not exceed the depth of said gate.

10. A method as claimed in claim 8, further comprising continuing to apply said pressure against said lens blank until said step of separating said movable frame member.

11. A method as claimed in claim 8, wherein said step of moving said wedge-shaped slide horizontally comprises applying pressure to a hydraulic piston which actuates said wedge-shaped slide member to move horizontally.

12. A method as claimed in claim 8, further comprising providing a plurality of said molding stations; said step of providing a wedge-shaped slide member includes providing at least one of said molding stations with a wedge-shaped slide member having a different size than the other molding stations; said step of selecting a home position for said wedge-shaped slide member includes selecting a home position for one of said slide members that defines a different maximum distance than the other of said wedge-shaped slide members; said step of delivering molten plastic resin includes simultaneously delivering molten plastic resin under injection pressure from a single source to each of said molding stations so that each of said female molds is moved to said maximum distance thereof; said step of moving said wedge-shaped slide horizontally includes moving each wedge-shaped slide member with an equal amount of force;

whereby, a plurality of lenses having the same or different optical power and a minimum of stress may be produced.

13. A method as claimed in claim 12, further comprising independently limiting a maximum distance that each said female molds moves away from said parting line at each said molding station to a maximum distance not exceeding the depth of a respective gate.

14. An apparatus for molding a lens comprising:
a male mold and a female mold defining therebetween a molding space;
means mounting one of said molds for movement toward and away from the other mold;
gate means mounted adjacent to said other mold for passage of thermal plastic resin; and other mold defining a window width for admitting thermoplastic resin to said molding space; said other mold floating away from said one mold in response to the admission of thermoplastic resin;
compression means for operatively engaging said other mold and movable from a home position to an end position to move said other mold toward said one mold and to compress thermoplastic resin within said molding space; and
means for adjusting the home position of said compression means to adjust the initial window width so as to balance thermoplastic resin fill speed and control the compression pressure applied to thermoplastic resin within said molding space.

15. An apparatus as in claim 14, wherein said compression means comprises a wedge-shaped slide member, the home position of said slide member defining a maximum distance said other mold may be spaced from said one mold so as to define the initial window width.

16. An apparatus as in claim 14, wherein said gate means comprises a retainer ring member surrounding said other mold; said retainer ring member limiting movement of said other mold and stationing said other mold relative to said one mold so that a portion of said other mold overlaps a portion of the width of said gate means so that said window width is less than the width of said gate means to thereby control the rate of injection of molten resin.

17. An apparatus as claimed in claim 14, further comprising a hydraulic piston for moving said compression means from said home position into said operative position.

18. An apparatus for molding a lens comprising:
a movable frame member and a fixed frame member, said movable frame member and said fixed frame member defining a parting line therebetween;
a male mold rigidly attached to said movable frame member;
a female mold supported in said fixed frame member so as to be free floating relative thereto, one end of said female mold being aligned with said male mold and spaced a predetermined distance from said parting line so as to define a cavity;
a retainer ring member surrounding said female mold and defining a gate through which a molten resin may be delivered to said cavity; said retainer ring member limiting movement of said female mold and stationing said female mold relative to said parting line so that a portion of said female mold overlaps a portion of the depth of said gate to thereby control the rate of injection of molten resin;
a wedge-shaped slide member operatively coupled to the other end of said female mold; said wedge-shaped slide member having a home position defining a maximum distance said female mold may be spaced from said male mold and an operative position on which said wedge-shaped slide member operatively engages said female mold.

19. An apparatus as claimed in claim 18, further comprising a hydraulic piston for moving said wedge-shaped slide member from said home position into said operative position.

20. An apparatus as claimed in claim 18, comprising a plurality of molding stations;
a runner extending to and communicating with each cavity; and
a common source of molten resin, each of said runners communicating with said common source to deliver resin under pressure to each of said cavities.

21. An apparatus as claimed in claim 20, further comprising a hydraulic piston fixed to each of said wedge-shaped slides to move each slide between said home position and said operative position,
a common manifold communicating with each of said pistons, whereby said slides maybe retracted to their home positions to permit said female molds to move in free floating relation until said cavities are full; and
means to actuate said pistons simultaneously to move said wedge-shaped slides into said operative position so that they may impart compression force through said female molds to compress the charges of resin within cavities simultaneously and with the same amount of compression force regardless of the difference of mass of resin delivered to the different cavities, whereby all of the lenses produced simultaneously are substantially free of stress.

22. An apparatus as claimed in claim 21, and further comprising means to retract said movable frame members so that all of the male molds simultaneously are retracted immediately before retracting said pistons simultaneously.

23. An apparatus as claimed in claim 18, wherein said means to permit free floating comprises a cap member engaging said female mold and having a circumferential flange extending radially outwardly from said cap member and a circumferentially extending recess for said retainer ring member receiving said flange and provided with space shoulders which a flange engages so as to define the inner and outer positions between which said female mold is free to float.

* * * * *